United States Patent [19]

Schaut et al.

[11] Patent Number: 4,556,302
[45] Date of Patent: Dec. 3, 1985

[54] CAMERA BOX FOR MICROFILM CAMERAS

[75] Inventors: Josef Schaut, Karben; Peter Ruppel, Bad Nauheim; Karl Hültner, Friedberg, all of Fed. Rep. of Germany

[73] Assignee: Firma SMA Schaut GmbH, Karben, Fed. Rep. of Germany

[21] Appl. No.: 524,900

[22] Filed: Aug. 22, 1983

[30] Foreign Application Priority Data

Aug. 25, 1982 [DE] Fed. Rep. of Germany ....... 3231539
Dec. 8, 1982 [DE] Fed. Rep. of Germany ....... 3245333

[51] Int. Cl.[4] ............................................. G03B 17/50
[52] U.S. Cl. ....................................... 354/83; 354/88; 354/212; 354/319; 355/27
[58] Field of Search ........................ 354/83, 88, 89, 90, 354/91, 92, 93, 319, 320, 322, 212; 355/27, 28

[56] References Cited

U.S. PATENT DOCUMENTS

| | | | |
|---|---|---|---|
| 3,697,173 | 10/1972 | Sasaki et al. | 355/27 |
| 3,747,493 | 7/1973 | Glidden et al. | 354/83 |
| 3,945,727 | 3/1976 | Nakajima et al. | 355/27 |
| 4,362,376 | 12/1982 | Otani | 354/319 |

FOREIGN PATENT DOCUMENTS 2945626 5/1981 Fed. Rep. of Germany ........ 354/89

Primary Examiner—A. A. Mathews
Attorney, Agent, or Firm—Kurt Kelman

[57] ABSTRACT

A camera box for a microfilm camera for processing a film carried by an aperture card comprises an elongated housing, a magazine for a series of the aperture cards in the housing, a film exposure station arranged in the housing to receive the aperture cards from the magazine in sequence, conveyors arranged in the housing for conveying a respective aperture card carrying an exposed film, the conveyors defining a travel path for the aperture cards in the housing, and a drying station in the travel path. The throughput speed of the cards through the camera box is improved by providing a first station for completely developing the exposed film of the respective aperture card and a second, like station for completely developing the exposed film of a subsequent one of the aperture cards, the first and second developing stations being arranged in the travel path between the exposure and drying stations, and the conveyors being arranged for alternately delivering the sequence of aperture cards carrying the exposed films from the exposure station to the first and second developing stations.

8 Claims, 6 Drawing Figures

CAMERA BOX FOR MICROFILM CAMERAS

The present invention is concerned with a camera box for microfilm cameras for processing a film carried by an aperture card, which comprises an elongated housing, a magazine for a series of the aperture cards in the housing, a film exposure station arranged in the housing to receive the aperture cards from the magazine in sequence, conveying means arranged in the housing for conveying a respective one of the aperture cards carrying an exposed film, the conveying means defining a travel path for the aperture cards in the housing, and a drying station in the travel path.

Camera boxes of the afore-mentioned type are generally known in the art and have been in use with microfilm cameras to form an essential part thereof.

The developing devices installed therein (so-called developing tanks) are of the type into which the aperture card with the exposed film section thereof is fed and developed by spraying a developing fluid, thereon, whereupon the card is removed from the device by suitable transporting means to reach a drying station, in which, as a rule, is equipped with control and possibly projecting means for monitoring the density of the microphotograph.

That developing operation requires a certain span of time in the order of between 15 and 18 seconds, i.e. the entire picture taking speed of the camera essentially depends on that span of time; hitherto, it has not been possible to reduce that overall picture taking speed up to the discharge of the card from the camera box, i.e. for example, six successively taken photographs will require approximately 90 to 108 seconds, as the times required for the individual photographs will be cumulative.

However, as high throughput numbers require increased rates of throughput, it is the object of the invention to provide a camera box of simple construction permitting such increased throughput rates.

This problem has been solved by a camera box of the aforementioned type which comprises, according to the invention a first station for completely developing the exposed film or the respective aperture card and a second, like station for completely developing the exposed film of a subsequent one of the aperture cards, the first and second developing stations being arranged in the travel path between the exposure and drying stations, and the conveying means being arranged for alternately delivering the sequence of aperture cards carrying the exposed films from the exposure station to the first and second developing stations.

Such a camera box will permit reducing the aforementioned span of time by a substantial amount from 90 to 60 seconds. For this, the embodiment wherein the second developing station is arranged in the travel path behind the first developing station is preferably used which is particularly simple to realize. In this embodiment, an exposed aperture card will skip the first developing device and move into the following one where the development is immediately started. However, during that period, already the next picture is taken so that already about 5 seconds after commencement of the development of the first photograph, the development of the second photograph may start, during which time the other developing device is cleared again. After completion of the development in the first developing device closest to the exposure station, the second developing device disposed therebehind in the direction of travel can be loaded again immediately.

A suitable configuration of the path of transport would, possibly, even permit a side-by-side arrangement of the developing devices (switch-type configuration, cross-wise staggered location in the area of the path of transport are equally possible); however, this will require more complex equipment so that the simplest embodiment is the preferred one in which the closest developing device is simply skipped.

The elements performing the transport of the aperture cards are, of course, so configured, located and operatively controlled that the afore-explained working cycle can be completed.

The problem encountered can also be solved in a different manner, i.e. by arranging the first and second developing stations in the housing at respective sides of the exposure station, a respective one of the drying stations being associated with each one of the developing stations, and the conveying means being arranged for conveying the respective aperture card with the exposed film in opposite directions for alternatively delivering the sequence of aperture cards to the developing stations on either side of the exposure station. Here, an exposed aperture card after having passed the exposure station will run into the subsequent first developing device where the development immediately starts. During that period, the next copy is already photographed and, hence, the next aperture card exposed so that immediately after commencement of the development of the first aperture card, development of the film on the second aperture card may equally start. The second card, however, is transported from the exposure station in opposite direction to the second developing station located ahead of the exposure station. After completion of the development in the first developing device, the same can be immediately loaded again which also applies to the second device as soon as the same has been cleared again.

The conveying means performing the transport of the aperture cards are, of course, also so configured, located and operatively controlled that the afore-explained working cycle can be completed, i.e. the conveying means disposed in the area of the exposure station are reversibly formed so that the aperture cards are transported alternately to one side and to the other.

Concerning the provision of the aperture card magazine, it should, in this case, be considered that the same must not impede the return of the one aperture card. For this reason, the aperture card magazine is preferably disposed at a level slightly higher than the plane of travel for the aperture cards in the camera box (also, the developing device concerned could be disposed at a slightly lower level) so that the exposed aperture card may be transported from the exposure station - while remaining in the same plane - into the second developing station disposed ahead thereof.

Under consideration of the lefthand and righthand conveyance of the aperture cards from the exposure station there, is another possibility of location for the aperture card magazine combined with a reduction in the travel path, viz. providing the magazine externally of the path of travel ahead of the exposure station, i.e. in that case, the aperture cards are fed into the exposure station crosswise of the path of travel and are then transported therefrom alternately to the right and to the left into the developing devices disposed at both sides next to the exposure station.

Apart from the speed increase relative to the throughput, there is another factor of importance, namely that the weight distribution relative to the camera box is more uniform.

As the film sections in the aperture cards relative to the longitudinal extension thereof are disposed eccentrically, this will have to be taken into consideration as regards the feed-in direction of the aperture cards into the exposure station and the alternate discharge to the right and to the left, and as regards the arrangement of the two developing devices located to the right and to the left; this requirement will be complied with by a correspondingly eccentric arrangement of the developing devices.

In connection with the afore-mentioned possibility of arranging the magazine externally of the path of travel ahead of the exposure station, it would even be possible to arrange the magazine, extending in the longitudinal direction of the aperture cards, ahead of the exposure station so that the aperture cards with their film section at the head, are vertically fed into the exposure station and in that position are discharged to the right and to the left, with the two developing stations being disposed at the same distance next to the exposure station. This will equally result in a reduction in the path of transport, and the entire camera box in terms of its overall length will be even more compact.

The camera box of the invention will now be described with reference to the now preferred embodiments illustrated in the accompanying drawing, wherein FIG. 1 is a sectional and side view of one embodiment of the camera box;

Figure 1:
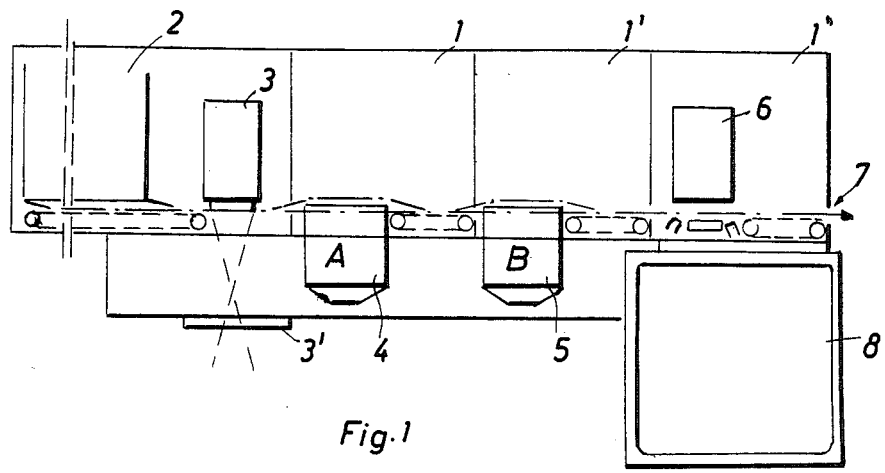
Figure 2:
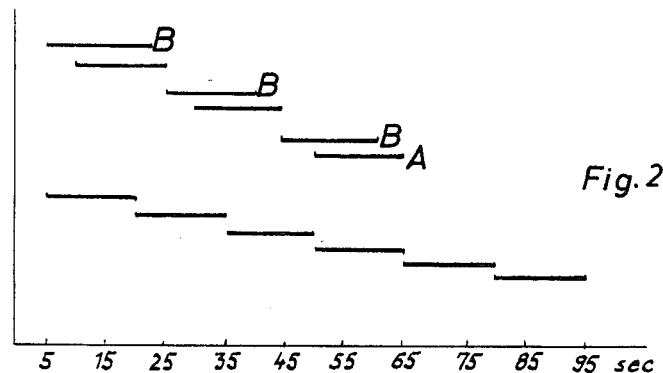
FIG. 2 is a time comparing diagram for taking, for example, six photographs.

Referring to FIGS. 1 and 2, the housing of the camera box is identified by reference number 1. The aperture cards are conveyed from the magazine 2 underneath the exposure station 3 in which the film of each card is exposed. The entire travel path of the exposed card to the discharge slot 7 at the lower end of the camera box is schematically illustrated in dash-dotted lines and by conveying elements shown in broken lines.

The exposed aperture card skips the first developing station A to get in the second developing station B. While it is developed there, developing station A is loaded with another exposed aperture card.

The aperture card with the completely developed photograph, is then ejected from station B and conveyed to drying station 6 where an additional image control can be performed by means of known systems, for example, by a monitor 8.

The card with the photograph developed in the first station A will follow and the whole operation will start anew. The time sequence of the developing phase in stations A and B is shown in the upper part of FIG. 2 for six photographs, with the sequence of development phases with a single developing device 4 in a conventional arrangement being shown in the bottom part. The time saving of about 30 seconds in six photographs arises from the overlap of two operations of development that has become possible by the arrangement of twin developing stations.

Feasibly, the second developing device 5 (B) is disposed in a separate and attachable housing 1' which, in addition, is adapted in size and connecting dimensions to housing 1" for the drying station 6, thereby permitting the camera box to be modularly built and permitting assembly of a separate housing 1' between the main housing including developing device 4 and housing 1", in the event that a higher throughput speed is desired.

Hence, the manufacturing effort and expense incurred by the manufacturer are relatively low with the preferred embodiment because, housing 1' of the additional developing device 5, may simply be inserted between already existing attachable housing 1" for the drying station 6 and housing 1.

Figure 3:
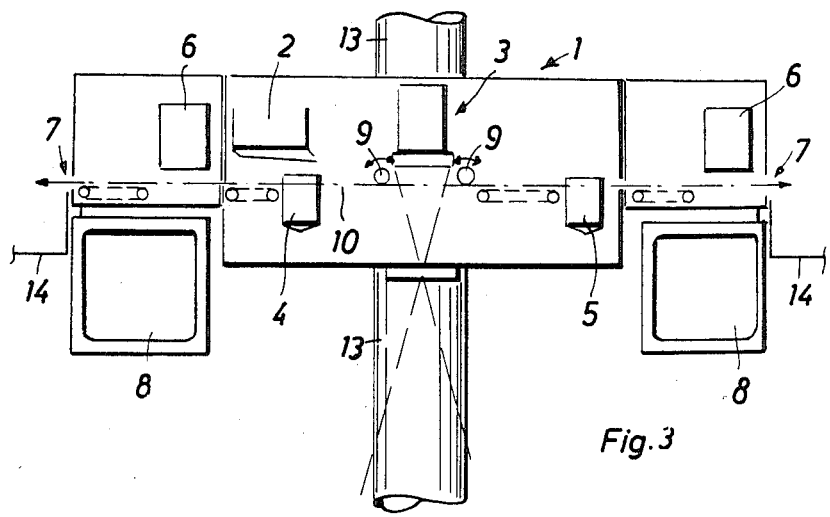
FIG. 3 is an elevational view of another embodiment of the camera box.
Figure 4:
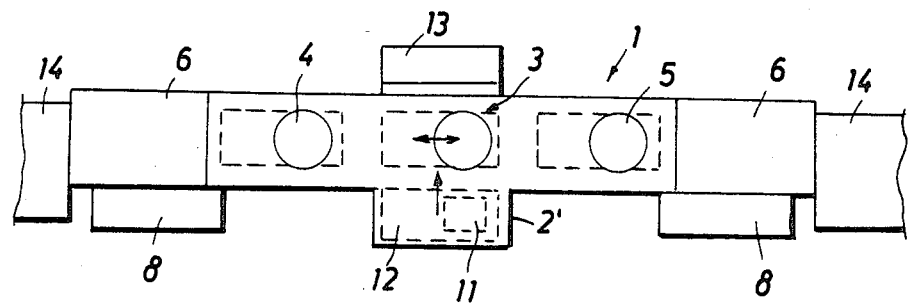
FIG. 4 is a plan view of yet another embodiment of the camera box.
Figure 5:
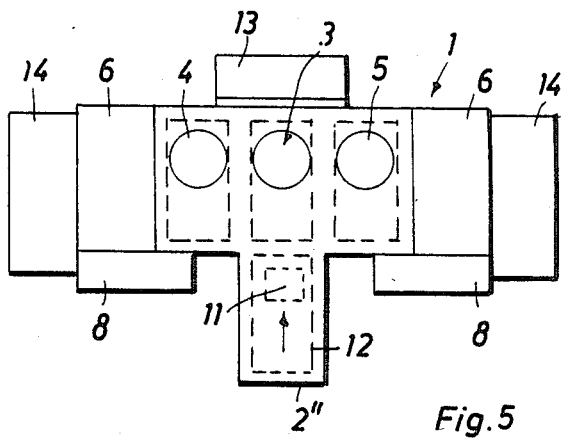
FIG. 5 is a plan view of a further embodiment of the camera box.
Figure 6:
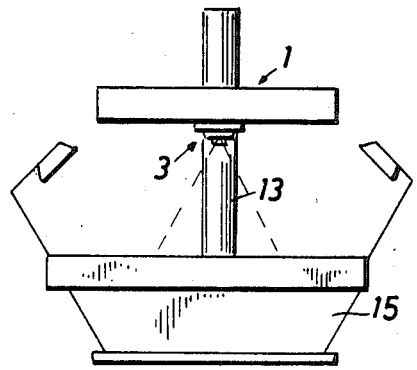
FIG. 6 is a view of the microfilm camera with the camera box.

Reference will now be made to FIGS. 3 to 5 using corresponding reference numerals.

The aperture cards move from magazine 2 of camera box 1 underneath exposure station 3 wherein the respective exposure is effected. The entire path of travel 10 to discharge slots 7 at both ends of the camera box 1 is shown in dash-dotted lines.

The aperture cards exposed in side-by-side relationship in the exposure station 3 are alternately fed into the developing stations 5,4 by the transporting elements 9 alternately controlled relative to their direction of rotation.

The aperture card with the developed and largely dried images will then be ejected to get into the after-drying stations 6 disposed on both sides; here, too, an image control can additionally be performed by means of known devices, for example, by means of monitors 8. Finally, the completed aperture cards are then ejected from the afterdrying stations 6 into the lateral collecting units 14. Such a collecting unit 14 is, of course, also provided on camera box 1 in FIG. 1, but has not been shown there.

As shown in FIG. 3, the two developing stations 4,5 are disposed eccentrically relative to the developing station 3 in camera box 1 in view of the eccentric arrangement of the film sections 1 in aperture cards 12.

As shown in FIG. 4, magazine 2' can also be arranged in different form, namely, as illustrated, externally of the actual travel path 10 ahead of the exposure station 3, i.e. aperture cards 12, by suitably located transporting elements, are pushed into exposure station 3 crosswise of their longitudinal extension.

The feed-in of the "blank cards" also can be effected from a magazine 2" longitudinally disposed normal to the path of travel 10, as shown in FIG. 5, with the two developing stations 4,5, being associated symmetrically with respect to exposure station 3.

In all embodiments, housing 1 of the camera box is adjustably guided over a copy table 15 on the vertical column 13. The alternate feed of the aperture cards to the right and to the left, in the embodiment according to FIG. 5, is performed transverse of the longitudinal extension which, as shown in comparison with FIGS. 3 and 4, involves a reduction in length of the camera box by approximately a complete aperture card length, and, moreover, an absolutely uniform weight distribution.

It is to be pointed out that the operator is not necessarily subjected to the attainable high speed of travel but, if need be, is able to control the afore-described course, e.g. by actuating a push button.

Basically, the waiting times of the aperture card input sequence, have been reduced to approximately the developing time in a single developing device since, after clearing thereof, the next exposed aperture card can be pushed forward and the following card can be fed into the exposure station and from here into the developing station on the other side.

What is claimed is:

1. A camera box for a microfilm camera for processing a film carried by an aperture card, which comprises
   (a) an elongated housing,
   (b) a magazine for a series of the aperture cards in the housing,
   (c) a film exposure station arranged in the housing to receive the aperture cards from the magazine in sequence,
   (d) conveying means arranged in the housing for conveying a respective one of the aperture cards carrying an exposed film, the conveying means defining a travel path for the aperture cards in the housing,
   (e) a drying station in the travel path, and
   (f) the improvement comprising
      (1) a first station for completely developing the exposed film of the respective aperture card and
      (2) a second, like station for completely developing the exposed film of a subsequent one of the aperture cards, the first and second developing stations being arranged in the travel path between the exposure and drying stations, and the conveying means being arranged for alternatively delivering the sequence of aperture cards carrying the exposed films from the exposure station to the first and second developing stations.

2. The camera box of claim 1, wherein the second developing station is arranged in the travel path behind the first developing station.

3. The camera box of claim 1, wherein the second developing station is arranged in a housing module attachable to the camera box housing.

4. The camera box of claim 3, wherein the camera box housing is comprised of detachable housing modules respectively enclosing the developing and drying stations.

5. The camera box of claim 1, wherein the first and second developing stations are arranged in the housing at respective sides of the exposure station, a respective one of the drying stations is associated with each one of the developing stations, and the conveying means is arranged for conveying the respective aperture card with the exposed film in opposite directions for alternately delivering the sequence of aperture cards to the developing stations on either side of the exposure station.

6. The camera box of claim 5, wherein the magazine is arranged above the travel path of the aperture cards.

7. The camera box of claim 5, wherein the magazine is arranged ahead of the exposure station outside the travel path of the aperture cards.

8. The camera box of claim 5, wherein the films are arranged eccentrically on the aperture cards and the developing stations are correspondingly eccentrically arranged with respect to the exposure station.

* * * * *